(12) United States Patent
Fenderson et al.

(10) Patent No.: US 11,034,583 B2
(45) Date of Patent: Jun. 15, 2021

(54) SYSTEMS AND METHODS FOR DEGASSING OF SULFUR

(71) Applicant: FLUOR TECHNOLOGIES CORPORATION, Sugar land, TX (US)

(72) Inventors: Stephen N. Fenderson, Gladewater, TX (US); Vincent W. Wong, Hacienda Heights, TX (US)

(73) Assignee: Fluor Technologies Corporation, Irving, TX (US)

( * ) Notice: Subject to any disclaimer, the term of this patent is extended or adjusted under 35 U.S.C. 154(b) by 0 days.

(21) Appl. No.: 16/034,475

(22) Filed: Jul. 13, 2018

(65) Prior Publication Data
US 2018/0319662 A1  Nov. 8, 2018

Related U.S. Application Data

(62) Division of application No. 14/875,096, filed on Oct. 5, 2015, now Pat. No. 10,059,588.

(51) Int. Cl.
| | |
|---|---|
| *C01B 17/02* | (2006.01) |
| *C01B 17/16* | (2006.01) |
| *C01B 17/04* | (2006.01) |
| *B01J 8/02* | (2006.01) |

(52) U.S. Cl.
CPC ............ *C01B 17/0232* (2013.01); *B01J 8/02* (2013.01); *C01B 17/0404* (2013.01); *C01B 17/165* (2013.01)

(58) Field of Classification Search
None
See application file for complete search history.

(56) References Cited

U.S. PATENT DOCUMENTS

| | | | |
|---|---|---|---|
| 4,729,887 A | 3/1988 | Pendergraft | |
| 4,755,372 A * | 7/1988 | Baker | B01J 27/04 423/578.1 |
| 4,844,720 A * | 7/1989 | Pendergraft | B01D 19/0005 95/235 |
| 5,632,967 A | 5/1997 | Nasato | |
| 6,010,677 A | 1/2000 | Scheybeler | |

(Continued)

FOREIGN PATENT DOCUMENTS

| | | |
|---|---|---|
| CA | 3000980 A1 | 4/2017 |
| CN | 103402910 A | 11/2013 |

(Continued)

OTHER PUBLICATIONS

Schaschke, Carl. (2014). Dictionary of Chemical Engineering—flame proofing. Oxford University Press. Retrieved from https://app.knovel.com/hotlink/pdf/id:kt00TW5Q11/dictionary-chemical-engineering/flame-proofing (Year: 2014).*

(Continued)

*Primary Examiner* — Sheng H Davis
(74) *Attorney, Agent, or Firm* — Conley Rose, PC

(57) ABSTRACT

Contemplated systems and methods for removing polysulfides and hydrogen sulfide from liquid sulfur of a Claus plant include (a) physically separated steps of catalytic decomposition of polysulfides and gas stripping, or (b) use of the stripping gas as the continuous phase in a packed column with decomposition catalyst to so avoid catalyst attrition.

17 Claims, 3 Drawing Sheets

(56) References Cited

U.S. PATENT DOCUMENTS

| | | | |
|---|---|---|---|
| 7,081,233 | B2 | 7/2006 | Louie |
| 8,084,013 | B2 | 12/2011 | Tonjes et al. |
| 8,361,432 | B2 | 1/2013 | Parekh et al. |
| 8,663,696 | B2 | 3/2014 | Garg et al. |
| 10,059,588 | B2 | 8/2018 | Fenderson et al. |
| 2009/0188837 | A1 | 7/2009 | Podrebarac |
| 2011/0020212 | A1* | 1/2011 | Tonjes ............... C01B 17/0232 |
| | | | 423/576.2 |
| 2012/0138510 | A1 | 6/2012 | Choe et al. |
| 2013/0330260 | A1* | 12/2013 | Liu .................... C01F 7/441 |
| | | | 423/222 |
| 2014/0366731 | A1 | 12/2014 | Nougayrede et al. |
| 2014/0377165 | A1 | 12/2014 | Keller |
| 2015/0259205 | A1 | 9/2015 | Borsboom et al. |
| 2018/0319662 | A1 | 11/2018 | Fenderson et al. |

FOREIGN PATENT DOCUMENTS

| | | |
|---|---|---|
| CN | 108367207 A | 8/2018 |
| EP | 0851836 B1 | 1/2000 |
| EP | 0717720 B1 | 3/2002 |
| EP | 2607304 B1 | 3/2005 |
| EP | 3359271 A1 | 8/2018 |
| GB | 2203732 B | 4/1991 |
| KZ | 34080 | 12/2019 |
| WO | 199506616 A1 | 3/1995 |
| WO | 2013006040 A1 | 1/2013 |
| WO | 2013091972 A1 | 6/2013 |
| WO | 2014035614 A1 | 3/2014 |
| WO | 2017061982 A1 | 4/2017 |

OTHER PUBLICATIONS

Fenderson, Stephen N. et al., "Liquid Sulfur Degassing", filed Mar. 15, 2019, U.S. Appl. No. 62/819,051.

Fenderson, Stephen N. et al., "Liquid Sulfur Degassing", filed Apr. 4, 2019, U.S. Appl. No. 62/829,332.

European Patent Application No. 15905928.6, filed Apr. 10, 2018, Extended European Search Report dated Mar. 25 2019.

European Patent Application No. 15905928.6, filed Apr. 10, 2018, EPO Communication Pursuant to Rules 70(2) and 70a(2) EPC dated Apr. 11, 2019.

Restriction Requirement dated Nov. 18, 2016, U.S. Appl. No. 14/875,096, filed Oct. 5, 2015.

Office Action dated Oct. 5, 2017, U.S. Appl. No. 14/875,096, filed Oct. 5, 2015.

Office Action dated Mar. 22, 2017, U.S. Appl. No. 14/875,096, filed Oct. 5, 2015.

Notice of Allowance dated Apr. 16, 2018, U.S. Appl. No. 14/875,096, filed Oct. 5, 2015.

Foreign Communication from a Related Counterpart—International Preliminary Report on Patentability dated Apr. 9, 2018, International Application No. PCT/US2015/054015, filed on Oct. 5, 2015.

Foreign Communication from a Related Counterpart—International Search Report and Written Opinion, dated Jul. 5, 2016, PCT Application No. PCT/US/2015/054015, filed on Oct. 5, 2015, 12 pages.

Chinese Patent Application No. 201580083667.5, filed Apr. 4, 2018, Notice of Entry Into Substantive Examination dated Oct. 15, 2018, 1 page.

European Patent Application No. 15905928.6, filed Apr. 10, 2018, EPO Communication Pursuant to Rule 161/162 dated May 16, 2018, 3 pages.

Fenderson, Stephen N. et al., "Systems and Methods for Degassing of Sulfur", filed Oct. 5, 2015, U.S. Appl. No. 14/875,096.

Fenderson, Stephen N. et al., "Systems and Methods for Degassing of Sulfur", filed Oct. 5, 2015, Application No. PCT/US15/54015.

Decision to Grant dated Oct. 4, 2019, Kazakhstan Patent Application No. 2018/0263.1 filed Oct. 5, 2015.

Kazakhstan Patent Application No. 2018/02631 filed Oct. 5, 2015, Office Action dated Jul. 11, 2019.

Chinese Patent Application No. 201580083667.5, filed Apr. 4, 2018, Office Action dated Mar. 2, 2020.

European Patent Application No. 15905928.6, filed Apr. 10, 2018, Communication Pursuant to Article 94(3) EPC dated Mar. 16, 2020.

\* cited by examiner

SYSTEMS AND METHODS FOR DEGASSING OF SULFUR

CROSS-REFERENCE TO RELATED APPLICATIONS

This application claims priority to and is a divisional of U.S. patent application Ser. No. 14/875,096 filed on Oct. 5, 2015 to Fenderson et al., entitled "Systems and Methods for Degassing of Sulfur," which is incorporated herein by reference in its entirety.

FIELD OF THE INVENTION

The field of the invention is degassing of liquid sulfur, especially as it relates to catalytic decomposition of polysulfides to hydrogen sulfide and removal of the hydrogen sulfide from the liquid sulfur.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

As the Claus process is an equilibrium process, presence of hydrogen sulfide in the liquid sulfur in and downstream of a sulfur condenser is inevitable. Unfortunately, dissolved hydrogen sulfide tends to spontaneously degas from the liquid into the headspace of conduits, vessels, pits, and other containers where it ultimately may reach toxic or explosive levels. Moreover, liquid sulfur will also contain appreciable quantities of polysulfides (H2Sx, with x typically between 8 and several hundred), which in turn can decompose into hydrogen sulfide, sulfur dioxide, and sulfur, adding to the hazardous conditions.

Consequently, numerous systems and methods have been developed for the removal of hydrogen sulfide and polysulfides from liquid sulfur. For example, GB2203732B teaches use of a decomposition catalyst in a storage tank that provides for recirculation of the liquid sulfur and uses sweep gas nozzles to expel hydrogen sulfide. A similar process having different treatment zones is described in U.S. Pat. No. 4,729,887A, while U.S. Pat. No. 7,081,233B2 uses static mixers and in-pit treatment of liquid sulfur. Alternatively, as described in US20140377165A1, a process gas is employed to agitate the liquid sulfur in the pit and so expel hydrogen sulfide, while WO2014035614A1 uses sparging mats to expel hydrogen sulfide from the sulfur in a pit. U.S. Pat. No. 4,755,372A uses a degassing zone with a catalyst and further degassing in the sulfur rundown pit with a sweep gas.

Hydrogen sulfide can also be kinetically removed from liquid sulfur as is described, for example, in EP2607304B1 where a relatively fine spray of liquid sulfur is formed in the presence of oxidizing gas in a first compartment, and where the so treated sulfur droplets coalesce into a liquid that is then drained into a second compartment. In a similar manner, U.S. Pat. No. 6,010,677A uses acceleration nozzles that discharge liquid sulfur against an impact target to remove the hydrogen sulfide. Alternatively, U.S. Pat. No. 8,084,013B2 teaches use of a gas-liquid eductor using the liquid sulfur as the ejector motive force and ambient sweep air as the active degassing agent in combination with a static mixer and packed bed.

To render polysulfide and hydrogen sulfide removal more compact, sulfur from a Claus plant can be processed in a single column as described in U.S. Pat. No. 4,844,720A. Here, a decomposition catalyst is disposed in a column that is swept with an oxygen containing purge gas. To further increase reaction rates, high-pressure oxidizing gas may be employed in counter current contact with the liquid sulfur as described in EP851836B1 and U.S. Pat. No. 5,632,967A. On the other hand, where the sweep gas is a low-oxygen or inert gas, sulfur can be degassed using a catalyst on a specific column packing that increases contact of gas bubbles and liquid sulfur as seen in U.S. Pat. No. 8,361,432B2. Similar catalyst structures are also discussed in U.S. Pat. No. 8,663,596B2. Similarly, WO2013006040A1 teaches use of a catalyst module with high void volumes to avoid catalyst attrition, while relatively rapid and efficient mass transfer may also be achieved by use of a stripping gas in the form of small bubbles in the presence of a strong Bronsted-Lowry base as is described in WO9506616A1.

However, despite these various systems and methods, numerous difficulties nevertheless remain. For example, where the catalyst material is used in a vessel with co-current upward flow of sulfur and air for decomposition of polysulfides to hydrogen sulfide and removal of hydrogen sulfide from the sulfur, the catalyst bed frequently becomes fluidized as the sulfur and catalyst densities are very similar, leading to catalyst attrition from abrasion of the particles. On the other hand, where counter-current flow of an oxygen-containing stripping gas is used, water and sulfur dioxide products tend to condense in cooler locations and lead to corrosion. In addition, where the catalyst is immobilized on a packing structure, high pump rates and relatively slow reaction rates are often encountered. Similarly, where desulfuration is performed in the run-down pit, slow reaction times and high circulation rates are often required.

Thus, even though numerous methods of sulfur treatment are known in the art, there still remains a need for improved systems and methods for removal of polysulfides and hydrogen sulfide from liquid sulfur.

SUMMARY OF THE INVENTION

The inventive subject matter is directed to various devices, systems, and methods for treatment of liquid sulfur using a catalyst and stripping gas in configurations that allow for high efficiency and low catalyst attrition. Most typically, these advantages are achieved by pretreating the sulfur prior to introduction of an inert or low oxygen concentration or air stripping gas, or by employing a fixed catalyst bed that utilizes a trickle bed concept with the sulfur flowing top to bottom across the bed while the upward flow of stripping gases acts as the continuous phase.

In one aspect of the inventive subject matter, a method of treating liquid sulfur containing polysulfides and hydrogen sulfide that includes a step of contacting the liquid sulfur with a decomposition catalyst under conditions effective to convert polysulfides to hydrogen sulfide to thereby generate a hydrogen sulfide enriched liquid sulfur stream and another step of stripping the hydrogen sulfide enriched liquid sulfur stream with a stripping gas to so generate an acid gas stream and a liquid sulfur product stream.

In some aspects of the inventive subject matter, the steps of contacting the liquid sulfur and stripping are performed in two separate sections of a common vessel, wherein the decomposition catalyst may be disposed above the stripping section and may be configured as a ring. In other aspects, the steps of contacting the liquid sulfur and stripping are performed in two separate vessels that are fluidly coupled to each other, for example, in a trickle bed column with the stripping gas being a continuous phase (e.g., under counter-current flow regime). While not limiting to the inventive subject matter, it is preferred that the stripping gas is an inert gas or a low-oxygen gas, and/or that the decomposition catalyst comprises a Claus or Claus-type catalyst. As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Therefore, viewed from another perspective, the inventors also contemplate a method of treating liquid sulfur containing polysulfides and hydrogen sulfide in which in one step liquid sulfur is contacted with a decomposition catalyst (Claus catalyst or Claus-type catalyst such as alumina oxide or a metal oxide supported on alumina oxide) in a trickle bed reactor under conditions effective to convert polysulfides to hydrogen sulfide to thereby generate hydrogen sulfide from the polysulfides. In another step, the hydrogen sulfide is swept from the trickle bed reactor with a stripping gas as a continuous phase to so form an acid gas stream and a liquid sulfur product stream.

Most typically, the stripping gas is an inert gas or a low-oxygen gas, and/or the step of sweeping is under a counter-current flow regime. Likewise, it is contemplated that the trickle bed reactor may comprise a fixed bad catalyst, and/or that the acid gas stream is fed to an incineration unit or Claus plant.

Consequently, the inventors also contemplate a treatment plant for treating liquid sulfur containing polysulfides and hydrogen sulfide. In especially contemplated plants, a Claus plant produces a stream of liquid sulfur that contains polysulfides and hydrogen sulfide, and the Claus unit is coupled to (a) a liquid sulfur contacting unit with a decomposition catalyst that converts polysulfides to hydrogen sulfide to so generate a hydrogen sulfide enriched liquid sulfur stream, and a stripping unit that strips the hydrogen sulfide enriched liquid sulfur stream with a stripping gas to so generate an acid gas stream and a liquid sulfur product stream; or (b) a trickle bed reactor with a decomposition catalyst to countercurrently contact the stream of liquid sulfur that contains polysulfides and hydrogen sulfide with a stripping gas as a continuous phase to thereby form a liquid sulfur product stream and an acid gas stream. In such plants, a container is then fluidly coupled to the stripping unit or trickle bed reactor to receive the liquid sulfur product stream.

In some embodiments, the liquid sulfur contacting unit is configured as a catalytic reactor that is fluidly coupled to the stripping unit, while in other embodiments the liquid sulfur contacting unit and the stripping unit are disposed in a single vessel. Most typically, the stripping gas is an inert gas or a low-oxygen gas, and the decomposition catalyst comprises a Claus catalyst.

Various objects, features, aspects and advantages of the inventive subject matter will become more apparent from the following detailed description of preferred embodiments, along with the accompanying drawing figures in which like numerals represent like components.

DETAILED DESCRIPTION

The inventors have discovered that liquid sulfur, typically originating from a Claus plant, can be treated in a conceptually simple yet effective manner to both decompose polysulfides and remove hydrogen sulfide without encountering various difficulties common in heretofore known systems and methods.

More particularly, contemplated systems and methods employ a Claus catalyst or Claus-type catalyst for decomposition of polysulfides to hydrogen sulfide in a process or configuration that avoids catalyst attrition by either pretreating the sulfur prior to introduction of the stripping gas (e.g., inert or low oxygen concentration gas or air), or by utilizing a fixed catalyst bed with a trickle bed concept in which sulfur flows from top to bottom across the bed with an upward flow of a stripping gas acting as the continuous phase. Most typically, the catalyst is or comprises a granular Claus catalyst or Claus like catalyst material (alumina oxide or metal oxides supported on alumina oxide or similar catalytic material) coating of a metal or ceramic support to enhance the decomposition of polysulfides. So produced hydrogen sulfide is then stripped from the sulfur at a moderate pressure, typically utilizing an inert of low oxygen concentration or air stripping gas. Thus, oxidation of sulfurous species to corrosive sulfur dioxide is avoided, as is catalyst attrition via friction and/or fluidization due to stripping gas in the catalyst section where the sulfur is the continuous phase.

Figure 1:
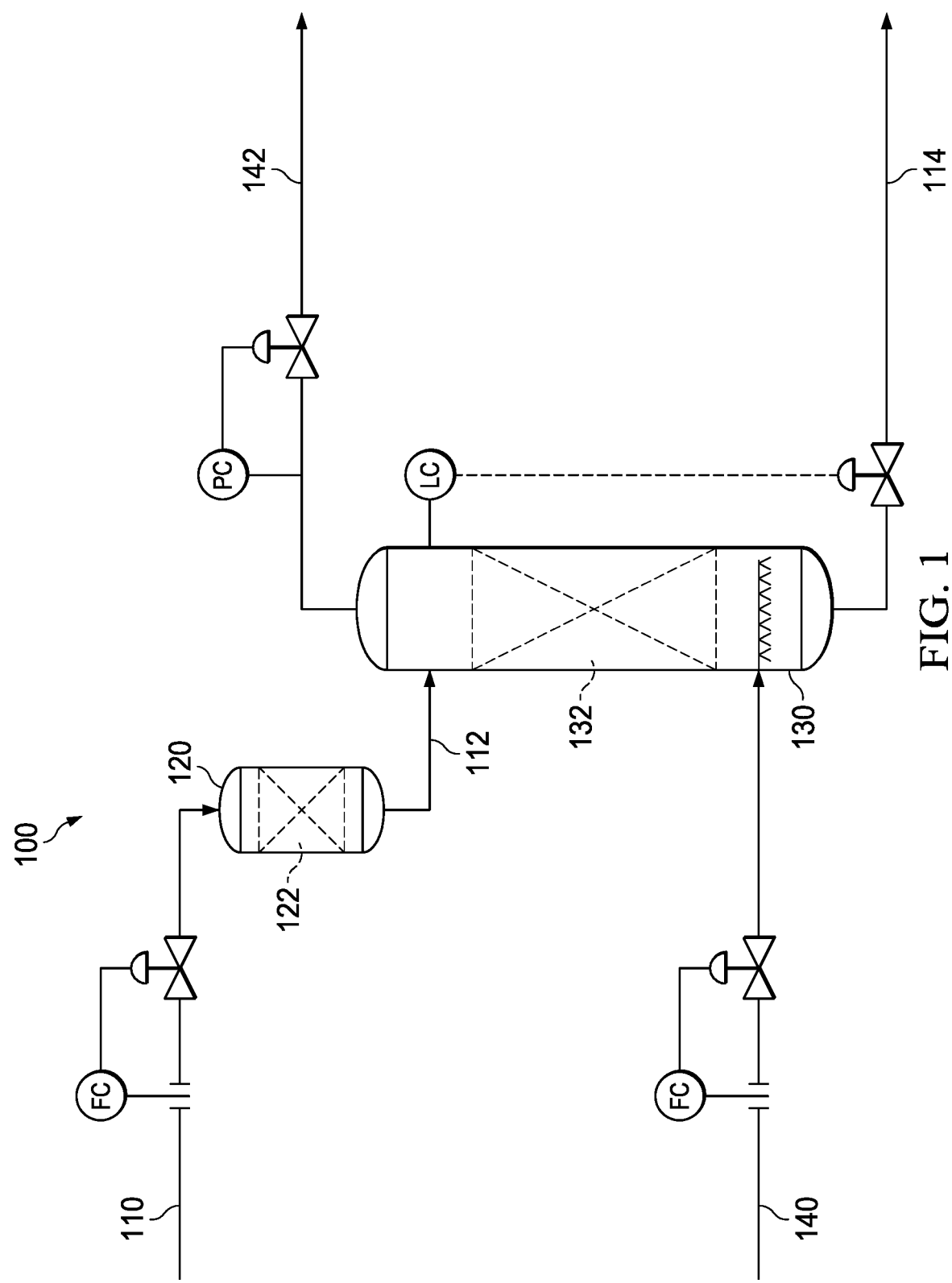
FIG. 1 is one exemplary sulfur treatment system according to the inventive subject matter in which liquid sulfur is run through to a packed bed polysulfide decomposition catalyst before being subjected to stripping gas in a stripping column.

In one aspect of the inventive subject matter, as schematically illustrated in FIG. 1, a treatment plant 100 for treating liquid sulfur receives from a Claus plant (not shown) a stream of undegassed liquid sulfur 110 that contains polysulfides and hydrogen sulfide. Stream 110 is then fed to a liquid sulfur contacting unit 120 that includes in a fixed bed a decomposition catalyst 122 that is active to convert polysulfides to hydrogen sulfide to so generate a hydrogen sulfide enriched liquid sulfur stream 112. A stripping unit 130 with packed bed 132 is fluidly coupled to the liquid sulfur contacting unit 120 and is configured to strip the hydrogen sulfide enriched liquid sulfur stream from the contacting unit 120 with a stripping gas 140 in countercurrent fashion to so generate an acid gas stream 142 and a liquid sulfur product stream 114 that is then fed to a rundown pit or other container (not shown) to at least transiently store the sulfur. As should be readily apparent from FIG. 1, the plant physically separates the steps of polysulfide decomposition to hydrogen sulfide from the step of stripping the hydrogen sulfide form the liquid sulfur and so avoids fluidization of the catalyst bed.

Figure 2:
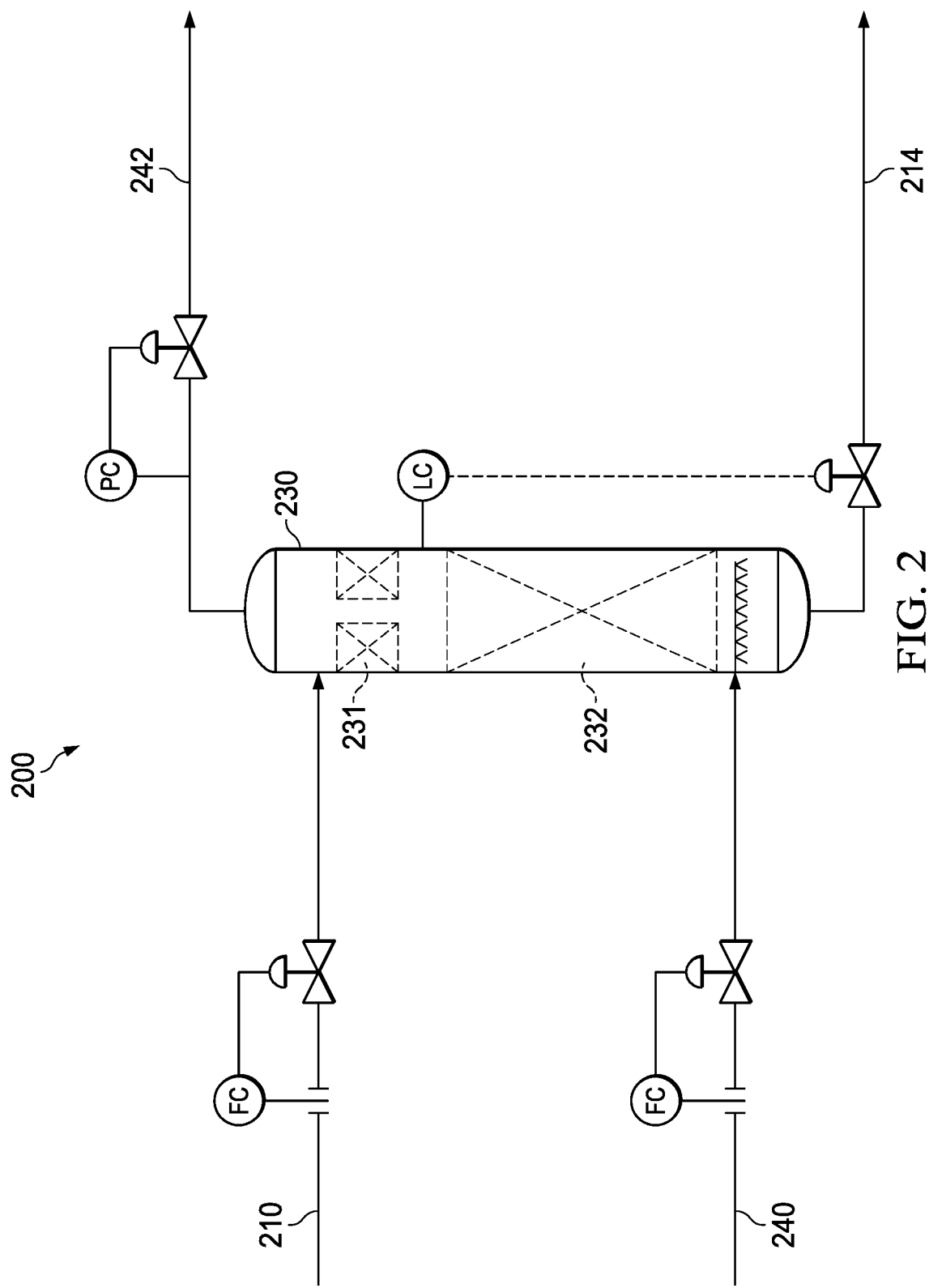
FIG. 2 is another exemplary sulfur treatment system according to the inventive subject matter in which liquid sulfur is treated in a combined column by passing the sulfur through a packed bed polysulfide decomposition catalyst section that is separate from a stripping section.

In another aspect of the inventive subject matter, as schematically illustrated in FIG. 2, a treatment plant 200 for treating liquid sulfur receives from a Claus plant (not shown) a stream of un-degassed liquid sulfur 210 that contains polysulfides and hydrogen sulfide. In contrast to FIG. 1, polysulfide decomposition and stripping is integrated into a single vessel 230 having a decomposition section 231 and a stripping section 232. Stream 210 enters vessel 230 and is first brought into contact with the ring shaped catalyst bed of decomposition section 231 for decomposition of polysulfides to hydrogen sulfide. The so formed hydrogen sulfide enriched liquid sulfur stream passes downwardly through the fixed bed into the stripping section 230 that has a packed bed 232 and that is configured to strip the hydrogen sulfide from the hydrogen sulfide enriched liquid sulfur stream with stripping gas 240 in counter-current fashion. Acid gas stream 242 leaves the vessel 230 after passing through the annular opening of the ring-shaped fixed bed, while a liquid sulfur product stream 214 exits the bottom section of the vessel towards a rundown pit or other container (not shown) to at least transiently store the sulfur. As before, it should be appreciated that in such configurations the steps of polysulfide decomposition to hydrogen sulfide and stripping the hydrogen sulfide form the liquid sulfur are physically separated and yet again avoid fluidization of the catalyst bed (due to the central opening in ring shaped catalyst bed as stripping gas will preferentially pass through such opening). Moreover, in the examples of FIGS. 1-2, the catalyst bed can be suitably sized to achieve a desired degree of decomposition and a decomposition rate in a manner that is largely independent form design considerations for the stripping section.

Figure 3:
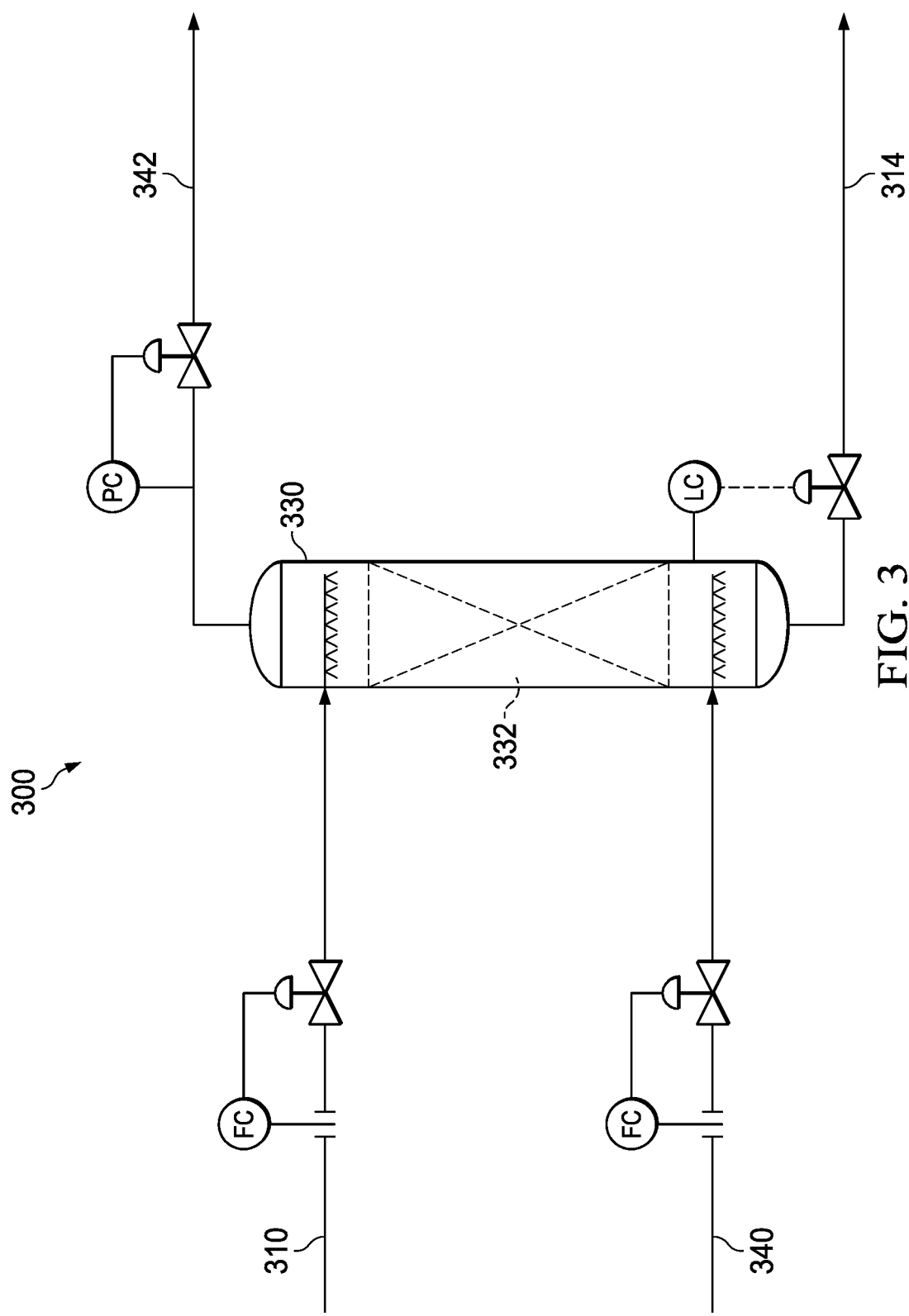
FIG. 3 is yet another exemplary sulfur treatment system according to the inventive subject matter in which liquid sulfur is subjected to a packed bed polysulfide decomposition catalyst and stripping gas as the continuous phase.

Alternatively, as schematically illustrated in FIG. 3, a treatment plant 300 for treating liquid sulfur receives from a Claus plant (not shown) a stream of un-degassed liquid sulfur 310 that contains polysulfides and hydrogen sulfide. Stream 310 is then fed to trickle bed reactor 330 that includes in a fixed bed a decomposition catalyst 322 that is active to convert polysulfides to hydrogen sulfide to so generate a hydrogen sulfide enriched liquid sulfur stream from which the stripping gas removes the hydrogen sulfide. Here, the catalyst is configured to allow down-flow of the liquid sulfur across (and into) the catalyst while the stripping gas 340 passes across the catalyst as continuous phase. It should also be noted that while FIG. 3 depicts the trickle bed reactor as a column where the stripping gas is fed counter-currently to the catalyst bed, other flow regimes (e.g., co-current down-flow) are also deemed suitable. Regardless of the flow regime, trickle bed reactor 330 produces acid gas stream 342 and liquid sulfur product stream 314 that is fed to a rundown pit or other container (not shown) to at least transiently store the sulfur. Once more, it should be recognized that such configurations and methods allow for treatment of polysulfide containing liquid sulfur in a manner that avoids catalyst attrition.

With respect to the type of catalyst used, it should be appreciated that all catalysts (and combinations thereof) are deemed appropriate that catalyze the decomposition of polysulfides in liquid sulfur to hydrogen sulfide. For example, suitable catalysts include granular Claus or Claus like catalyst material, and especially porous alumina oxide or metal oxides supported on alumina oxide, non-promoted or promoted activated alumina, and titania catalysts along with a alumina-titania composite, all of which may be structured, or coated onto a metal or ceramic support to enhance the decomposition of polysulfides to hydrogen sulfide, and to allow hydrogen sulfide to be stripped from the sulfur at typically low to moderate pressure with or without the use of a stripping gas.

Depending on the particular configuration, it is further contemplated that the catalyst may be disposed in the catalytic reactor in fixed bed, packed bed, a loose collection of contact bodies supported by a large retaining structure, etc. Likewise, the decomposition can be performed in a single section, or in multiple sections that may or may not be interspersed with one or more stripping sections. Regardless of the type of catalyst and arrangement of the catalyst beds, it is generally preferred that the plants include sufficient catalyst to reduce the polysulfide content at least 50%, at least 70%, at least 80%, at least 90%, or at least 95% (compared to the polysulfide content of the un-degassed sulfur entering the plant). Viewed from a different perspective, the catalyst will be present in an amount effective to reduce polysulfide content in the liquid sulfur to equal or less than 100 ppm, equal or less than 50 ppm, equal or less than 20 ppm, or equal or less than 10 ppm.

Polysulfide decomposition is most preferably performed at pressures and temperatures at which sulfur is liquid, typically at least 140° C., or at least 160° C., or at least 200° C., or at least 250° C., or at least 300° C., or at least 340° C., and less than 440° C., with pressures between about 1 atm and 50 atm, and more typically between 1 atm and 20 atm. It is still further contemplated that the decomposition of polysulfides may be performed in the presence of oxidizing agents or gases (e.g., atmospheric air, oxygen-containing gases), but also in the absence of air or oxidizing agents or gases (e.g., no agents or gases, or use of inert gases). Consequently, decomposition of polysulfides may be in the presence of absence of any gas flow. Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Most typically, decomposition of polysulfides is performed in a separate section, which may be in a separate vessel as exemplarily shown in FIG. 1 or separate section of a vessel as exemplarily shown in FIG. 2. Additionally, decomposition of polysulfides may also be run in a thin film on a surface or within a cavity of a catalyst that is typically supported on a structured packing or other carrier with high surface. Thus, should be noted that polysulfide decomposition in a given volume of sulfur is performed to a relatively large degree (e.g., at least 70%, at least 80%, at least 90%, or at least 95%) before the so treated sulfur is contacted with stripping gas. It is also noted that such volume can be relatively large, for example, where the decomposition catalyst is in a distinct vessel (e.g., at least 0.1 m3, at least 0.5 m3, at least 1.0 m3, at least 5.0 m3, etc.) or relatively moderate (e.g., at least 0.05 m3, at least 0.1 m3, at least 0.0 m3, at least 1.0 m3, etc.) where the decomposition catalyst is in a separate portion of the same vessel. Where the catalyst is in a trickle bed reactor, the volume may be relative small (e.g., at least 0.01 m3, at least 0.05 m3, at least 0.1 m3, at least 0.5 m3, etc.).

Suitable gas streams to remove the hydrogen sulfide from the hydrogen sulfide enriched liquid sulfur stream (stream after contact with decomposition catalyst) typically include inert gas or gases with a reduced oxygen concentration (relative to ambient air). For example, stripping gases will comprise nitrogen, argon, combustion exhaust gases (preferably post decarbonization), etc. However, air is also deemed suitable for use, and even oxygen enriched streams. With regard to flow rates of stripping gases it is generally preferred that the flow rate is sufficient to reduce the hydrogen sulfide concentration in the liquid sulfur to equal or less than 100 ppm, to equal or less than 50 ppm, to equal or less than 20 ppmv, or to equal or less than 10 ppmv. Alternatively, stripping may be performed using agitation, kinetic treatment, or via recycling of the liquid sulfur through a sparging area. Thus, depending on the particular method, stripping gas may be pumped, injected, or sparged into the treated sulfur, and/or column packing. Where the column is a trickle bed column, it is generally preferred that the column is configured and operated such that the stripping gas acts as a continuous phase. Therefore, the stripping gas can contact the treated sulfur or liquid sulfur co-currently or in a counter current flow regime.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. Finally, and as used herein and throughout the claims that follow, the meaning of "a," "an," and "the" includes plural reference unless the context clearly dictates otherwise.

What is claimed is:

1. A treatment plant for treating liquid sulfur containing polysulfides and hydrogen sulfide, the treatment plant comprising:
   a Claus unit that is configured to produce a stream of liquid sulfur that contains polysulfides and hydrogen sulfide, wherein the Claus unit is coupled to:
   a trickle bed reactor that comprises a fixed bed of a decomposition catalyst, wherein the trickle bed reactor is configured to concurrently i) contact the stream of liquid sulfur that contains polysulfides with the decomposition catalyst under conditions effective to convert polysulfides to hydrogen sulfide to thereby generate hydrogen sulfide enriched liquid sulfur and ii) strip the hydrogen sulfide from the hydrogen sulfide enriched liquid sulfur in the fixed bed with a stripping gas as a continuous phase to thereby form a liquid sulfur product stream and an acid gas stream,
   wherein the fixed bed of the decomposition catalyst comprises a ring shaped decomposition catalyst bed that is active to convert the polysulfides in the stream of liquid sulfur to hydrogen sulfide to thereby generate a hydrogen sulfide enriched liquid sulfur stream.

2. The treatment plant of claim 1, further comprising:
   a container fluidly coupled to the trickle bed reactor and configured to receive the liquid sulfur product stream.

3. The treatment plant of claim 1, wherein the Claus unit is further coupled to a common vessel having a decomposition section and a stripping section, wherein the decomposition section is positioned above the stripping section.

4. The treatment plant of claim 3, wherein the fixed bed of the decomposition catalyst is configured to receive the stripping gas in a counter-current flow regime.

5. The treatment plant of claim 1, wherein the ring shaped decomposition catalyst bed comprises a central opening, wherein the central opening is configured to receive at least a portion of the stripping gas.

6. The treatment plant of claim 1, wherein the stripping gas is an inert gas.

7. The treatment plant of claim 1, wherein the stripping gas is a low-oxygen gas.

8. The treatment plant of claim 1, wherein the decomposition catalyst comprises a Claus catalyst.

9. The treatment plant of claim 1, wherein the decomposition catalyst comprises a Claus like catalyst material.

10. The treatment plant of claim 1, wherein the fixed bed of the decomposition catalyst is configured to receive the stripping gas to strip hydrogen sulfide from the hydrogen sulfide enriched liquid sulfur stream to so generate the acid gas stream and the liquid sulfur product stream.

11. The treatment plant of claim 10, further comprising:
    a container fluidly coupled to the trickle bed reactor and configured to receive the liquid sulfur product stream.

12. The treatment plant of claim 10, wherein the trickle bed reactor is a common vessel having a decomposition section and a stripping section, wherein the stripping section is configured for counter-current flow regime.

13. The treatment plant of claim 10, wherein the stripping gas is an inert gas.

14. The treatment plant of claim 10, wherein the stripping gas is a low-oxygen gas.

15. The treatment plant of claim 10, wherein the decomposition catalyst in the fixed bed comprises a Claus catalyst.

16. The treatment plant of claim 10, wherein the decomposition catalyst in the fixed bed comprises a Claus like catalyst material.

17. The treatment plant of claim 10, wherein the ring shaped decomposition catalyst bed comprises a central opening, wherein the central opening is configured to receive at least a portion of the stripping gas.

* * * * *